United States Patent
Ishikawa

(10) Patent No.: US 8,230,420 B2
(45) Date of Patent: Jul. 24, 2012

(54) APPARATUS FOR TRANSFERRING A VIRTUAL MACHINE USING STORED CORRESPONDENCE INFORMATION

(75) Inventor: Akira Ishikawa, Machida (JP)

(73) Assignee: Canon Kabushiki Kaisha (JP)

( * ) Notice: Subject to any disclaimer, the term of this patent is extended or adjusted under 35 U.S.C. 154(b) by 791 days.

(21) Appl. No.: 12/369,269

(22) Filed: Feb. 11, 2009

(65) Prior Publication Data

US 2009/0217265 A1 Aug. 27, 2009

(30) Foreign Application Priority Data

Feb. 21, 2008 (JP) ................................. 2008-040456

(51) Int. Cl.
*G06F 9/455* (2006.01)
*G06F 9/46* (2006.01)

(52) U.S. Cl. .......................................................... 718/1

(58) Field of Classification Search .................. None
See application file for complete search history.

(56) References Cited

U.S. PATENT DOCUMENTS

| 2005/0268298 | A1* | 12/2005 | Hunt et al. | 718/1 |
|---|---|---|---|---|
| 2006/0005189 | A1* | 1/2006 | Vega et al. | 718/1 |
| 2006/0218544 | A1* | 9/2006 | Chakraborty et al. | 717/168 |
| 2008/0215796 | A1* | 9/2008 | Lam et al. | 711/100 |
| 2008/0222375 | A1* | 9/2008 | Kotsovinos et al. | 711/162 |

FOREIGN PATENT DOCUMENTS

| JP | 7-121330 A | 5/1995 |
|---|---|---|
| JP | 2004-234114 A | 8/2004 |
| JP | 2007-226587 A | 9/2007 |

OTHER PUBLICATIONS

Office action issued in corresponding Japanese Patent Application 2008-040456 dated May 28, 2012.

* cited by examiner

*Primary Examiner* — Corey S Faherty

(74) *Attorney, Agent, or Firm* — Rossi, Kimms & McDowell LLP

(57) ABSTRACT

A virtual machine is transferred between an information processing apparatus and another information processing apparatus via a communication unit which communicates with the other information processing apparatus via a network. For a virtual machine which operates in the virtual machine operating environment of the information processing apparatus, correspondence relationship information representing the correspondence relationship between the virtual machine and a storage unit which stores a virtual disk file to be accessed by the virtual machine is managed using a storage correspondence table. Access from the virtual machine which has issued an access request to the virtual disk file is controlled by looking up the storage correspondence table.

8 Claims, 12 Drawing Sheets

APPARATUS FOR TRANSFERRING A VIRTUAL MACHINE USING STORED CORRESPONDENCE INFORMATION

BACKGROUND OF THE INVENTION

1. Field of the Invention

The present invention relates to an information processing apparatus having a virtual machine operating environment where a plurality of virtual machines can operate, a method of controlling therefor, and a program.

2. Description of the Related Art

Along with the spread of network environments, printer apparatuses and MFPs (Multi-Function Peripherals) connectable to a network have come along. In a standard office environment, a plurality of users share a plurality of MFPs.

In such an environment, even when a job is unexecutable in a given device, it may be executable in another device on the network. Hence, a job transfer technique of transferring a job to another device and executing it has been proposed (e.g., Japanese Patent Laid-Open No. 7-121330).

To transfer a job using this job transfer technique, it is necessary to convert it into some static intermediate data.

During execution, a job stores temporary data halfway through calculation in a temporary file on a hard disk or in a memory area managed by the OS. It is therefore impossible to simply transfer a job that is being executed at an arbitrary timing using only the job transfer technique.

For example, to transfer a job because of paper-out or toner-out, the job is converted into intermediate data and transferred after it is found out that the job is unexecutable. However, the above-described job transfer technique cannot transfer a job if it should be transferred because, e.g., shortage of the memory capacity disables even calculation for intermediate data conversion.

In this case, data is temporarily discarded midway through the calculation, and the calculation is performed again at the transfer destination. Since the calculation must be done twice because of the data discard, printing takes a time more than necessary.

If calculation in progress is, e.g., rendering of complex PDL data, a calculation time of several ten minutes goes to waste.

Virtual machine techniques represented by VMware and xen are becoming common for the purpose of, e.g., decreasing the number of servers.

A virtual machine technique provides a resume fiction which makes it possible to temporarily stop all programs including an OS running on a device, store the stop state (data on the CPU register and data on the RAM) as the state file of a virtual machine, and resume the virtual machine from this stop state.

Combining the above-described job transfer technique and the resume function of the virtual machine technique allows to transfer a job during execution.

More specifically, a job which is being executed can be transferred by temporarily stopping the job during operation for each virtual machine, transferring the state file of the virtual machine, and resuming it at the transfer destination.

However, to cause the virtual machine to actually resume the operation, a storage such as a hard disk to be accessed by the virtual machine is necessary. Transferring, via a network, hard disk data of about 100 Gbytes required for resuming a virtual machine is not realistic from the viewpoint of the transfer time and the storage capacity required at the transfer destination.

Generally, to transfer a virtual machine, a storage is prepared on a server on a network in advance so that the virtual machine can access it using a mechanism such as an NFS (Network File System) provided by the OS.

However, an MFP frequently reads out or writes image data as a temporary file of image processing from or in a storage during print processing. This generates a large quantity of traffic between the CPU and the storage. The speed of traffic is directly linked with the print speed.

In this case, if a storage exists on the network, the print speed decreases. For this reason, an arrangement which always places a storage on a network poses a problem from the viewpoint of print performance.

SUMMARY OF THE INVENTION

The present invention has been made to solve the above-described problems, and has as its object to provide an information processing apparatus capable of improving performance when transferring a virtual machine between devices on a network and processing a job, a method of controlling the same, and a program.

According to the first aspect of the present invention, an information processing apparatus having a virtual machine operating environment where a plurality of virtual machines are operable, comprises a storage unit adapted to store a virtual disk file to be accessed by a virtual machine, a communication unit adapted to communicate with another information processing apparatus via a network, a transfer unit adapted to transfer the virtual machine between the information processing apparatus and the other information processing apparatus via the communication unit, a management unit adapted to manage, for each of the virtual machines which operate in the virtual machine operating environment of the information processing apparatus, including virtual machines which have operated in another virtual machine operating environment of the other information processing apparatus, correspondence relationship information representing a correspondence relationship between the virtual machine and the storage unit which stores the virtual disk file to be accessed by the virtual machine using a storage correspondence table, the correspondence relationship information being transferred from the other information processing apparatus by the transfer unit, and a control unit adapted to control access from the virtual machine which has issued an access request to the virtual disk file by looking up the storage correspondence table managed by the management unit.

In a preferred embodiment, the correspondence relationship information includes address information representing a storage location in one of the storage unit of the information processing apparatus and the storage unit of the other information processing apparatus, where a virtual disk file to be accessed by each of the virtual machines operating in the virtual machine operating environment of the information processing apparatus is stored, and the control unit controls, in accordance with the address information included in the correspondence relationship information for the virtual machine which has issued an access request, access from the virtual machine to the virtual disk file at the storage location represented by the address information, by looking up the storage correspondence table.

In a preferred embodiment, to transfer a job which is being executed on the virtual machine, the transfer unit temporarily stops the virtual machine, transfers the virtual machine to the other information processing apparatus of a transfer destination, and resumes the virtual machine in the other information processing apparatus of the transfer destination, thereby transferring the job which is being executed.

In a preferred embodiment, the apparatus further comprises a determination unit adapted to determine whether a normal operation of the virtual machine in the virtual machine operating environment can be continued, wherein if the determination unit determines that the normal operation of the virtual machine cannot be continued, the transfer unit transfers the virtual machine to the other information processing apparatus.

In a preferred embodiment, at a timing of transfer of the virtual machine of a transfer target, the transfer unit transfers the correspondence relationship information of the virtual machine to the other information processing apparatus together with the virtual machine of the transfer target.

In a preferred embodiment, the management unit updates the storage correspondence table based on one of the correspondence relationship information of a virtual machine transferred by the transfer unit from the information processing apparatus to the other information processing apparatus and the correspondence relationship information of a virtual machine received by the transfer unit from the other information processing apparatus to the information processing apparatus.

According to the second aspect of the present invention, a method of controlling an information processing apparatus having a virtual machine operating environment where a plurality of virtual machines are operable, comprises the steps of transferring a virtual machine between the information processing apparatus and another information processing apparatus via a communication unit adapted to communicate with the other information processing apparatus via a network, managing, for each of the virtual machines which operate in the virtual machine operating environment of the information processing apparatus, including virtual machines which have operated in another virtual machine operating environment of the other information processing apparatus, correspondence relationship information representing a correspondence relationship between the virtual machine and a storage unit which stores a virtual disk file to be accessed by the virtual machine using a storage correspondence table, the correspondence relationship information being transferred from the other information processing apparatus in the transferring step, and controlling access from the virtual machine which has issued an access request to the virtual disk file by looking up the storage correspondence table managed in the managing step.

According to the third aspect of the present invention, a program stored in a computer-readable medium to cause a computer to control an information processing apparatus having a virtual machine operating environment where a plurality of virtual machines are operable, the program causes the computer to execute the steps of transferring a virtual machine between the information processing apparatus and another information processing apparatus via a communication unit adapted to communicate with the other information processing apparatus via a network, managing, for each of the virtual machines which operate in the virtual machine operating environment of the information processing apparatus, including virtual machines which have operated in another virtual machine operating environment of the other information processing apparatus, correspondence relationship information representing a correspondence relationship between the virtual machine and a storage unit which stores a virtual disk file to be accessed by the virtual machine using a storage correspondence table, the correspondence relationship information being transferred from the other information processing apparatus in the transferring step, and controlling access from the virtual machine which has issued an access request to the virtual disk file by looking up the storage correspondence table managed in the managing step.

Further features of the present invention will become apparent from the following description of exemplary embodiments with reference to the attached drawings.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
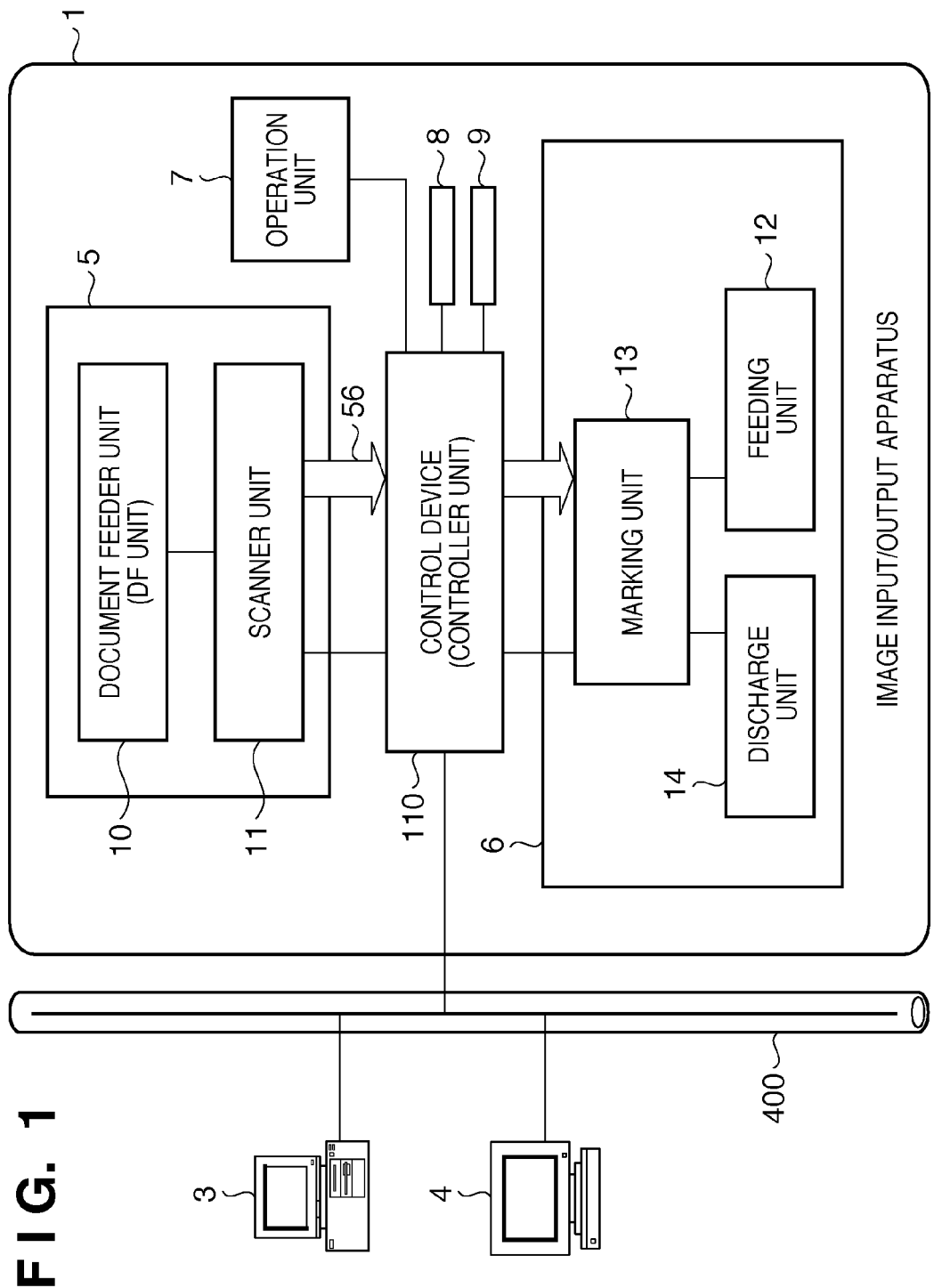
FIG. 1 is a block diagram showing an embodiment of an image input/output apparatus (data processing apparatus) which incorporates a controller unit serving as an electronic component according to the present invention.

FIG. 1 is a block diagram showing an embodiment of an image input/output apparatus (data processing apparatus) which incorporates a controller unit serving as an electronic component according to the present invention.

An image input/output apparatus 1 is connected to (host computers) (in this embodiment, first and second host computers 3 and 4) via a LAN (Local Area Network) 400 such as Ethernet®.

The image input/output apparatus (system) 1 includes a reader unit 5 which executes image data reading processing, a printer unit 6 which executes image data output processing, and an operation unit 7 which executes an image data input/ output operation and includes a liquid crystal panel to display image data and various functions. Hard disk drives 8 and 9 in which control programs and data such as image data are written in advance are attached to the image input/output apparatus 1.

The image input/output apparatus 1 also includes a controller unit 110 which is formed from a single electronic component connected to the constituent elements of the image input/output apparatus 1 and control them.

The reader unit 5 includes a document feeder unit (DF unit) 10 which conveys a document page, and a scanner unit 11 which optically reads a document image and converts it into image data as an electrical signal.

The printer unit 6 includes a feeding unit 12 having a plurality of paper feed cassettes to store printing paper sheets, and a marking unit 13 which prints (transfers or fixes) image data on a printing paper sheet. The printer unit 6 also includes a discharge unit 14 which performs post-processing such as sorting or stapling of printed paper sheets and discharging them out of the apparatus.

The image input/output apparatus 1 can also be regarded as an information processing apparatus capable of receiving various kinds of information (data) including an image, executing target processing, and outputting the information.

The detailed internal structures of the reader unit 5 and the printer unit 6 will be described next with reference to FIG. 2.

Figure 2:
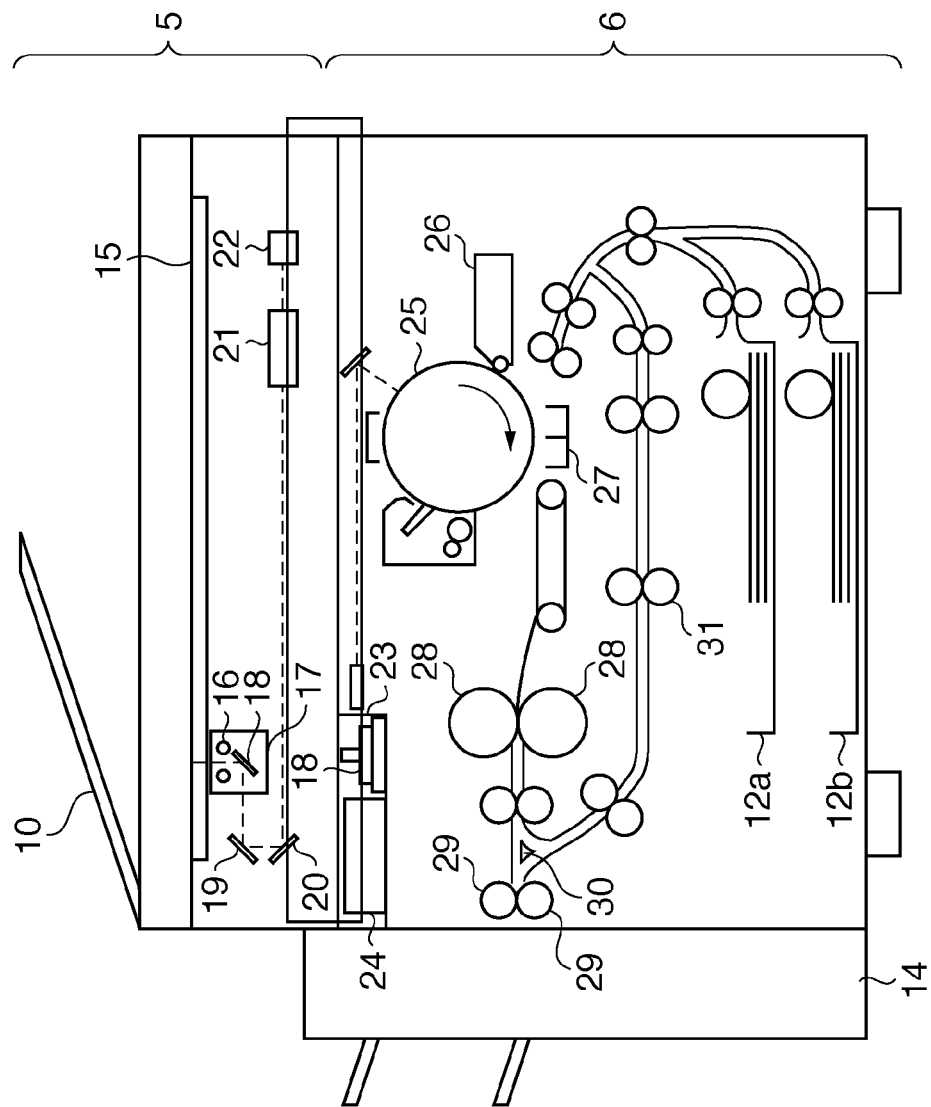
FIG. 2 is a view showing the detailed arrangements of a reader unit and a printer unit according to the embodiment of the present invention.

FIG. 2 is a view showing the detailed arrangements of the reader unit and the printer unit according to the embodiment of the present invention.

The reader unit 5 is mounted on the printer unit 6. In the reader unit 5, document pages stacked on the document feeder unit 10 are fed onto a platen glass 15 one by one sequentially from the top page in accordance with the staking order. After the scanner unit 11 has ended a predetermined reading operation, each read document page is discharged from the platen glass 15 to the document feeder unit 10.

In the scanner unit 11, when a document page is fed onto the platen glass 15, a lamp 16 lights up. Next, an optical unit 17 starts moving. It is fixed at the reading position.

The optical unit 17 irradiates and scans the fed document page from the lower side. Light reflected by the document page is guided to a CCD image sensor (to be simply referred to as a CCD hereinafter) 22 via a plurality of mirrors 18 to 20 and a lens 21 so that the CCD 22 reads the scanned document image. The image data read by the CCD 22 is subjected to predetermined processing and transferred to the controller unit 110 (not illustrated in FIG. 2). Alternatively, a document page is placed on the document platen. After the lamp 16 lights up, the optical unit 17 starts moving to irradiate and scan the document page from the lower side so that the CCD 22 reads the scanned document image.

The image data output from the reader unit 5 in accordance with the above-described procedure is sent to the controller unit 110 via a scanner connector 56 (FIG. 1).

In the printer unit 6, a laser emitting unit 24 driven by a laser driver 23 emits a laser beam corresponding to the image data output from the controller unit 110. The laser beam forms an electrostatic latent image on a photosensitive drum 25 in the marking unit 13. A developer 26 attaches a developing material to the electrostatic latent image portion.

In synchronism with the start of laser beam irradiation, a printing paper sheet is fed from the feeding unit 12 (paper feed cassette 12*a* or 12*b*) to a transfer unit 27 so that the developing material attached to the photosensitive drum 25 is transferred to the printing paper sheet. The printing paper sheet with the transferred image data is fed to a fixing unit 28.

The fixing unit 28 fixes the image data on the printing paper sheet by heating and pressing.

When image data is printed on one surface of a printing paper sheet, the printing paper sheet that has passed through the fixing unit 28 is immediately discharged to the discharge unit 14 via discharge rollers 29. The discharge unit 14 bundles and sorts the discharged printing paper sheets or staples the sorted printing paper sheets.

To print image data on both surfaces of a printing paper sheet, the printing paper sheet is fed to the discharge rollers 29, and the rotation directions of the discharge roller 29 are reversed. The printing paper sheet is guided to a refeeding path 31 via a flapper 30. The printing paper sheet guided to the refeeding path 31 is fed to the transfer unit 27 in the same way as described above.

The controller unit 110 is formed from a single electronic component, as described above. The controller unit 110 has a scanner function of converting image data read by the reader unit 5 into code data and transmitting it to the first and second host computers 3 and 4 via the LAN 400. The controller unit 110 also has a printer function of converting code data received from the host computers 3 and 4 via the LAN 400 into image data and outputting it to the printer unit 6, and other functional blocks.

The detailed arrangement of the controller unit 110 will be described next with reference to FIG. 3.

Figure 3:
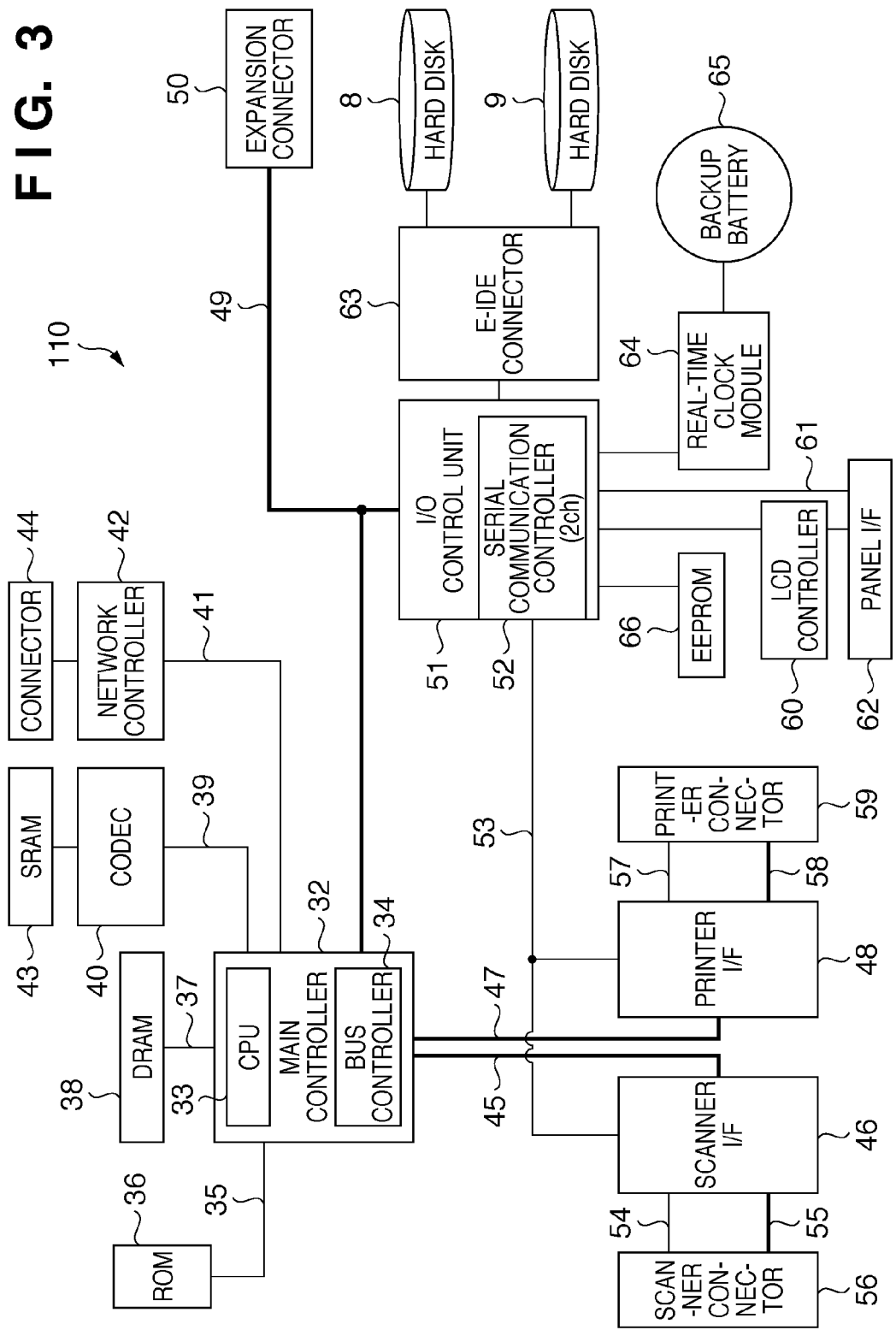
FIG. 3 is a block diagram showing the detailed arrangement of the controller unit according to the embodiment of the present invention.

FIG. 3 is a block diagram showing the detailed arrangement of the controller unit according to the embodiment of the present invention.

A main controller 32 incorporates a CPU 33, a bus controller 34, and functional blocks including various kinds of controller circuits to be described later. The main controller 32 is connected to a ROM 36 via a ROM I/F 35 and to a DRAM 38 via a DRAM I/F 37.

The main controller 32 is also connected to a codec 40 via a codec I/F 39 and to a network controller 42 via a network I/F (communication unit) 41.

The ROM 36 stores arithmetic data and various kinds of control programs to be executed by the CPU 33 in the main controller 32. The DRAM 38 serves as a work area where the CPU 33 operates or an area to store image data. The codec 40 compresses raster image data stored in the DRAM 38 by a known compression method such as MH, MR, MMR, or JBIG and decompresses compressed data into raster image data. An SRAM 43 is connected to the codec 40. The SRAM 43 serves as a temporary work area for the codec 40.

A network controller 42 performs a predetermined control operation with respect to the LAN 400 via a connector 44.

The main controller 32 is also connected to a scanner I/F 46 via a scanner bus 45 and to a printer I/F 48 via a printer bus 47.

The main controller 32 is also connected, via a global high-speed bus 49 such as a PCI bus, to an input/output control unit (I/O control unit) 51 and an expansion connector 50 to connect an expansion board.

The I/O control unit 51 includes an asynchronous serial communication controller 52 having two channels to transmit/receive control commands to/from the reader unit 5 or the printer unit 6.

The serial communication controller 52 is connected to the scanner I/F 46 and the printer I/F 48 via an I/O bus 53.

The scanner I/F 46 is connected to a scanner connector 56 via a first asynchronous serial I/F 54 and a first video I/F 55. The scanner connector 56 is connected to the scanner unit 11 of the reader unit 5.

The scanner I/F 46 performs, for image data received from the scanner unit 11, desired binarization or scaling in the main scanning direction and/or the sub-scanning direction. The scanner I/F 46 also generates a control signal based on a video signal transmitted from the scanner unit 11 and transfers it to the main controller 32 via the scanner bus 45.

The printer I/F 48 is connected to a printer connector 59 via a second asynchronous serial I/F 57 and a second video I/F 58. The printer connector 59 is connected to the marking unit 13 of the printer unit 6.

The printer I/F 48 performs smoothing processing for image data output from the main controller 32 and outputs the image data to the marking unit 13. The printer I/F 48 also generates a control signal based on a video signal transmitted from the marking unit 13 and transfers it to the main controller 32 via the printer bus 47.

The CPU 33 operates based on a control program loaded from the ROM 36 via the ROM I/F 35.

For example, the CPU 33 interprets PDL (Page Description Language) data received from the first and second host computers 3 and 4 and expands it to raster image data.

The bus controller 34 controls transfer of data input/output from/to external devices connected via the scanner I/F 46, printer I/F 48, and expansion connector 50 and particularly controls arbitration in bus conflict and DMA data transfer. That is, the bus controller 34 controls, e.g., data transfer between the DRAM 38 and the codec 40, data transfer from the scanner unit 11 to the DRAM 38, and data transfer from the DRAM 38 to the marking unit 13. The data transfer is implemented by DMA transfer.

The I/O control unit 51 is connected to a panel I/F 62 via an LCD controller 60 and a key input I/F 61. The panel I/F 62 is connected to the operation unit 7.

The I/O control unit 51 is also connected to an EEPROM 66 serving as a nonvolatile memory. The I/O control unit 51 is also connected to the hard disk drives 8 and 9 via an E-IDE connector 63 and to a real-time clock module 64 which updates/stores date and time managed in the device.

The real-time clock module 64 is connected to a backup battery 65 and backed up by it.

The detailed internal arrangement of the main controller 32 will be described next with reference to FIG. 4.

Figure 4:
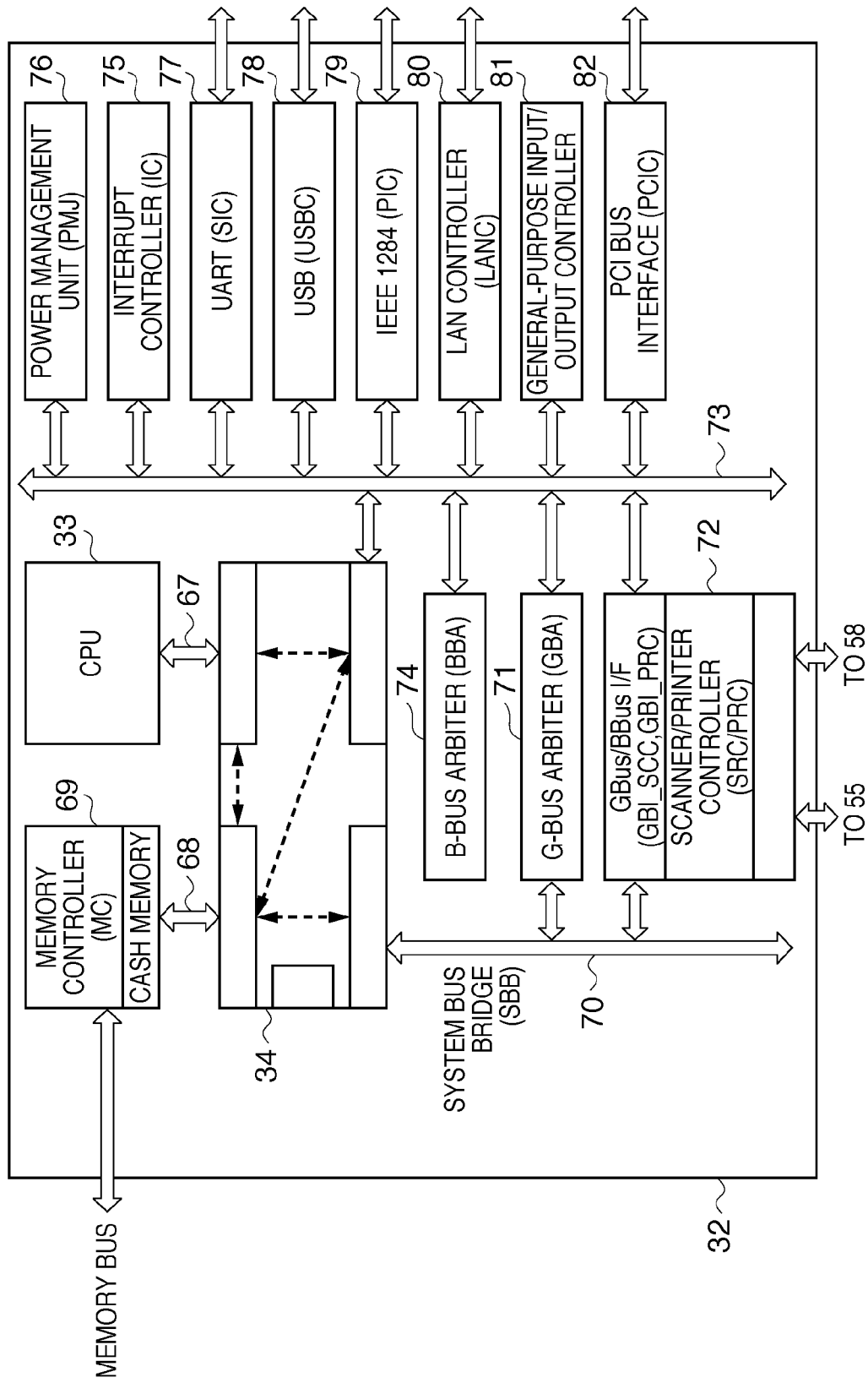
FIG. 4 is a block diagram showing the detailed internal arrangement of a main controller according to the embodiment of the present invention.

FIG. 4 is a block diagram showing the detailed internal arrangement of the main controller according to the embodiment of the present invention.

The bus controller 34 includes 4×4 64-bit cross bus switches and is connected to the CPU 33 via a 64-bit processor bus (P-bus) 67. The bus controller 34 is also connected to a memory controller (MC) 69 having a cache memory 69a via a local bus (M-bus) 68 dedicated to the memory.

The memory controller 69 is connected to memories such as the ROM 36 and the DRAM 38 and controls their operations.

The bus controller 34 is also connected to a G-bus arbiter 71 and a scanner/printer controller 72 via a graphics bus (G-bus) 70. The bus controller 34 is also connected to a B-bus arbiter 74, the G-bus arbiter 71, an interrupt controller 75, and various functional blocks via an input/output bus (B-bus) 73.

The various functional blocks include a power management unit 76, a serial I/F controller 77 such as UART, and a USB (Universal Serial Bus) controller (USBC) 78.

The various functional blocks also include a parallel I/F controller 79 such as IEEE1248, a LAN controller 80, and a general-purpose input/output controller 81.

The various functional blocks also include the scanner/printer controller 72, and a PCI bus interface 82 which controls an I/F operation between the B-bus 73 and a PCI bus as an external bus.

The B-bus arbiter 74 performs arbitration control on the B-bus 73. Upon receiving a bus use request for the B-bus 73, the B-bus arbiter 74 performs arbitration and gives a use permission to a selected master, thereby inhibiting two or more masters from simultaneously accessing the bus. In the arbitration method, three priority levels are prepared, and a plurality of masters are assigned to each priority level.

The interrupt controller 75 stacks interrupts from the above-described functional blocks and from outside of the controller unit 110 and redistributes them to various controllers (72, 77 to 81) supported by the CPU 33 and a non-maskable interrupt (NMI).

The power management unit 76 manages power for each functional block and monitors the power consumption of the controller unit 110 which is a one-chip electronic component. More specifically, the controller unit 110 is formed from a large-scale ASIC (Application Specific Integrated Circuit) incorporating the CPU 33. For this reason, if all functional blocks operate simultaneously, a large quantity of heat may be generated to cause breakdown of the controller unit 110 itself.

To prevent this, the power management unit 76 manages the power consumption of each functional block, and accumulates the power consumptions of the functional blocks as a power management level. The power management unit 76 totalizes the power consumptions of the functional blocks and collectively monitors them such that the power consumption does not exceed the power consumption limit.

The G-bus arbiter 71 performs arbitration control on the G-bus 70 by a central arbitration method and has a dedicated request signal and permission signal for each bus master. When giving priority to a bus master, the G-bus arbiter 71 can designate a fairness arbitration mode which gives the same priority to all bus masters to impartially give the bus right. Alternatively, the G-bus arbiter 71 can designate a priority arbitration mode which causes one of the bus masters to preferentially use the bus.

The software configuration of a virtual machine which operates on the image input/output apparatus having the above-described arrangement will be described next with reference to FIG. 5.

Figure 5:
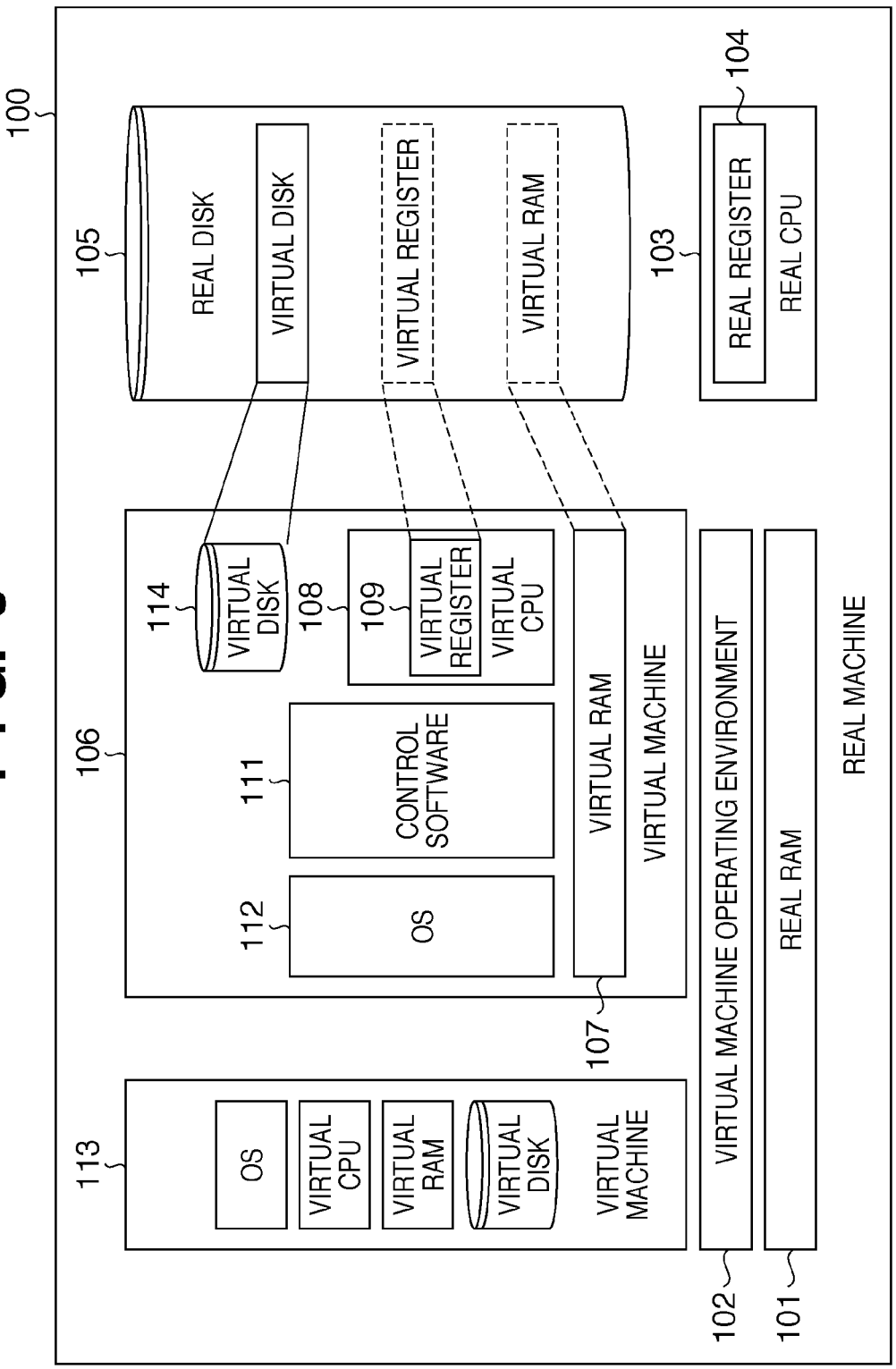
FIG. 5 is a block diagram showing a software configuration which implements a virtual machine according to the embodiment of the present invention.

FIG. 5 is a block diagram showing a software configuration which implements a virtual machine according to the embodiment of the present invention.

A virtual machine 106 is implemented as a program which operates on a real machine 100. The virtual machine 106 is executed on the real machine 100 simultaneously with another virtual machine 113 or a virtual machine operating environment 102. In the virtual machine operating environment 102, a plurality of virtual machines including the virtual machines 106 and 113 can operate.

Software applications (e.g., OS 112 and control software 111) which operate on the virtual machine 106 implement processing while interacting with devices such as a CPU, RAM, and disk, like software on the real machine 100. At this time, devices (e.g., virtual RAM 107, virtual disk 114, and virtual CPU 108) viewed from the software on the virtual machine 106 are not the devices of the virtual machine 106 but virtual devices.

All the virtual devices are implemented as software modules on the virtual machine 106 and emulate the real machine 100.

For example, the virtual RAM 107 allocates areas on the work memory of the process of the virtual machine 106 and holds values using the same layout and I/F as those of a real RAM 101, thereby making the software on the virtual machine 106 recognize as if the real RAM 101 were present there.

For example, the virtual CPU 108 which is a module in the virtual machine 106 implements the same behavior as a real CPU 103. More specifically, the virtual CPU 108 holds the same register set as a real register 104 of the real CPU 103 in an area allocated on the work memory, thereby making the software on the virtual machine 106 recognize as if the real CPU 103 were present there.

For example, the virtual disk 114 is implemented as a file which holds the bit pattern of a real disk 105. The entity of the file is held in the real disk 105 on the real machine 100. The virtual machine 106 presents the file contents of the virtual disk 114 using the same I/F as that of the real disk 105, thereby making the software on the virtual machine 106 recognize as if the real disk 105 were present there.

Considering that the virtual machine normally operates in the above-described arrangement, its operation in a suspension mode will be described below.

When the virtual machine operating environment 102 issues a suspension instruction to the virtual machine 106, the virtual machine 106 stops the operation of the virtual CPU 108 at that timing and writes out the contents of a virtual register 109 to the real disk 105 as a file on the real machine 100.

Next, the virtual machine 106 writes out the bit pattern on the virtual RAM 107 to the real disk 105 as a file on the real machine 100. After that, the virtual machine 106 ends the process and disappears from the real RAM 101.

An operation of resuming the virtual machine 106 after suspension will be described next.

When the virtual machine operating environment 102 instructs to resume the virtual machine 106, the process of the virtual machine 106 is activated. At this time, the module of the virtual CPU 108 does not operate yet.

The value of the virtual register 109 at the last end is read out from the file on the real disk 105 and set in the virtual CPU 108.

The value of the virtual RAM 107 at the last end is read out from the file on the real disk 105 and set in the virtual RAM 107.

In this state, the operation of the module of the virtual CPU 108 is started.

With the above operation, even when various kinds of software are operating on the virtual machine 106, it is possible to interrupt the operation while holding the state at that instant, including the state of the virtual CPU 108, and resume the operation at an arbitrary timing.

Using the above-described arrangements of the image input/output apparatus and the virtual machine as an example, a detailed embodiment of the present invention will be described next with reference to FIGS. 6 to 12.

Figure 6:
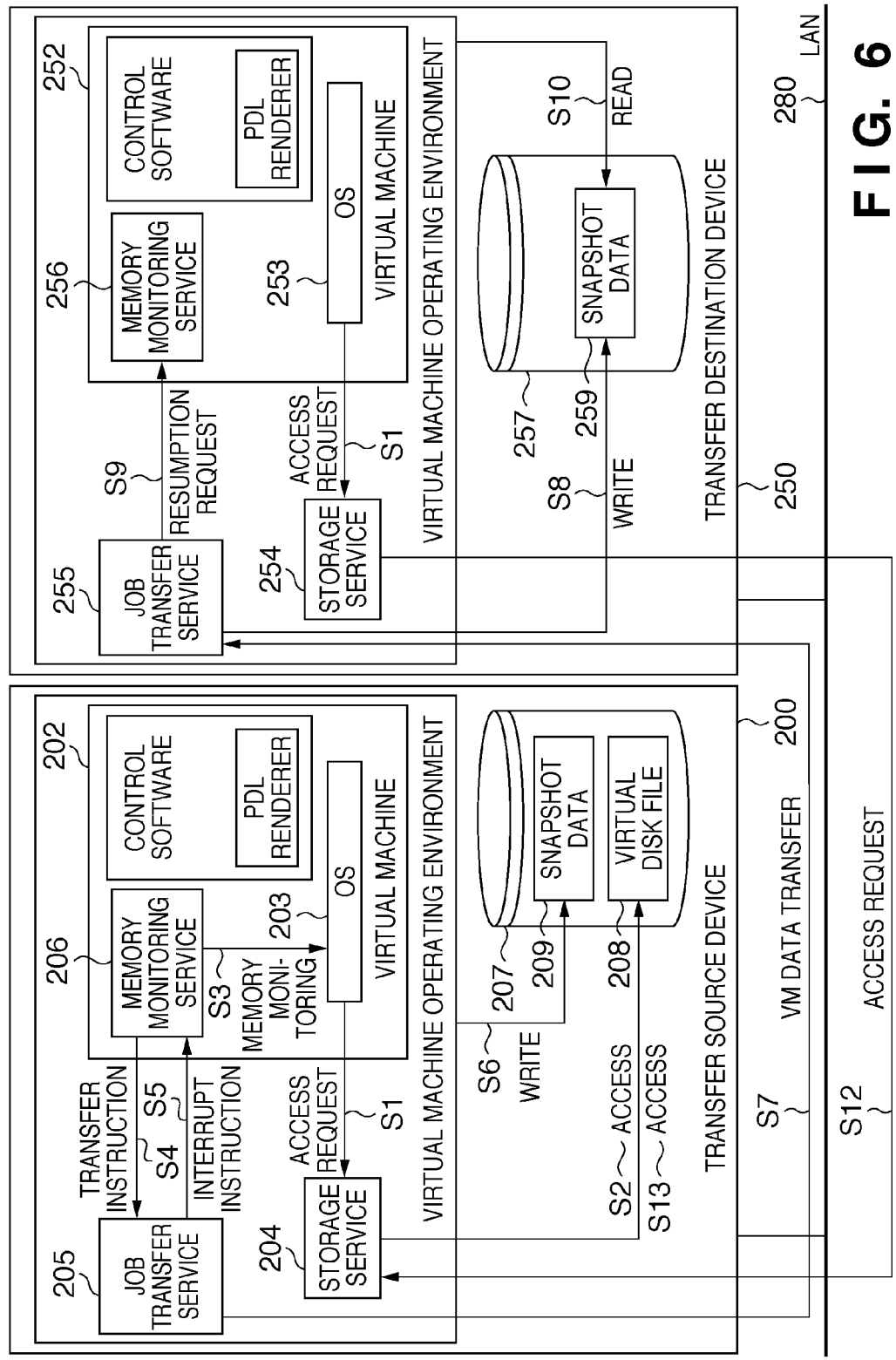
FIG. 6 is a block diagram showing the sequence of storage access and virtual machine transfer according to the embodiment of the present invention.

FIG. 6 is a block diagram showing the sequence of storage access and virtual machine transfer according to the embodiment of the present invention.

Especially, as for the storage access and virtual machine transfer, the relationship between the modules will mainly be explained with reference to FIG. 6.

Storage access means access to a storage device (storage unit) such as a hard disk mounted in the apparatus.

When storage access occurs on a transfer source device 200 during a normal operation, an OS 203 operating on a virtual machine 202 accesses a virtual disk provided by a virtual machine operating environment 201. When access to the virtual disk occurs, an access request to a storage service 204 which operates in the virtual machine operating environment 201 is generated (step S1).

Upon receiving the access request, the storage service 204 accesses a virtual disk file 208 based on correspondence relationship information (storage correspondence table) with the storage and returns the storage data to the virtual machine 202 (step S2).

A memory monitoring service 206 monitors the OS 203 and, upon detecting memory depletion, starts an operation of transferring the virtual machine 202 (step S3).

"Memory depletion" indicates, e.g., a state in which the available memory capacity is equal to or less than a threshold value with respect to the used memory capacity. The threshold value is determined based on the available memory capacity when the shortage of the available memory capacity impedes the normal operation of the devices of the virtual machine so they cannot normally operate, normally execute processing, or continue processing. That is, the memory monitoring service 206 implements a determination function of determining whether the virtual machine can continue the normal operation. If it is determined that the normal operation of the virtual machine cannot be continued, the virtual machine is transferred.

The memory monitoring service 206 issues a transfer instruction to a job transfer service 205 which operates in the virtual machine operating environment 201 (step S4).

Upon receiving the transfer instruction, the job transfer service 205 issues an interrupt instruction to instruct the virtual machine 202 to temporarily interrupt the operation (step S5).

Upon receiving the interrupt instruction, the virtual machine 202 stops the operation. The virtual machine operating environment 201 writes the data of the state of the virtual machine 202 in a real disk 207 as snapshot data 209 (step S6). The data of the state of the virtual machine 202 includes the data of the virtual RAM and the data of the register of the virtual CPU in the virtual machine 202.

After confirming the stop of the virtual machine 202, the job transfer service 205 starts communicating, via a LAN 280, with a job transfer service 255 which operates in a virtual machine operating environment 251 on a transfer destination device 250. The job transfer service 205 transfers the snapshot data 209 of the virtual machine 202 and the correspondence relationship information with the storage as VM (Virtual Machine) data (step S7).

Upon receiving the snapshot data 209, the job transfer service 255 writes it in a real disk 257 of the transfer destination device 250 as snapshot data 259 (step S8).

After confirming that the write of the snapshot data 259 has ended, the job transfer service 255 instructs a virtual machine 252 to resume the operation (step S9). Note that a memory monitoring service 256 implements the same operation as that of the memory monitoring service 206.

The virtual machine operating environment 251 reads out the snapshot data 259, starts the process of the virtual machine 252, sets data in the virtual CPU register and the virtual RAM based on the snapshot data 259, and starts the operation of the virtual CPU (step S10).

This allows the virtual machine 252 to resume the processing from the timing of the stop of the virtual machine 202.

When disk access occurs from an OS 253 on the virtual machine 252, the virtual machine 252 issues an access request to a storage service 254 (step S11).

The storage service 254 starts communicating, via the LAN 280, with the storage service 204 which operates on the transfer source device 200, and issues an access request based on the correspondence relationship information (step S12).

The storage service 204 accesses the virtual disk file 208 in accordance with the access request and returns the storage data (step S13).

The correspondence relationship with the storage described in the above sequence will be described with reference to FIGS. 7 to 9.

Figure 7:
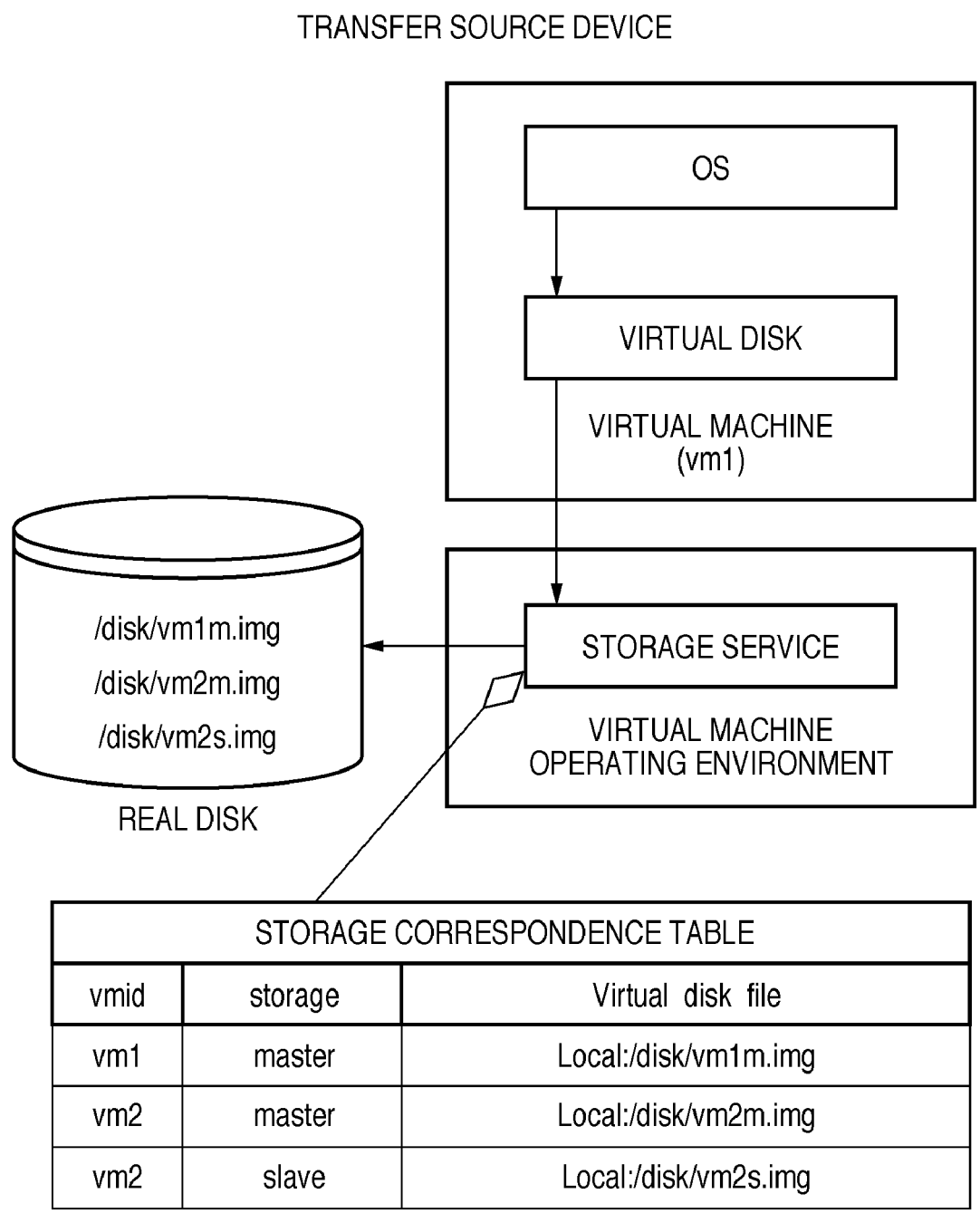
FIG. 7 is a view showing the state of a storage correspondence table before transfer according to the embodiment of the present invention.

FIG. 7 is a view showing the state of the storage correspondence table before transfer according to the embodiment of the present invention. FIG. 8 is a view showing the state of the storage correspondence table during transfer according to the embodiment of the present invention. FIG. 9 is a view showing the state of the storage correspondence table after transfer according to the embodiment of the present invention.

When the virtual machine on the transfer source device issues an access request to the storage during the operation, the storage service which operates on the transfer source device has a storage correspondence table which describes files in the local directory. Hence, the storage service accesses the local files.

For example, the storage correspondence table shown in FIG. 7 describes that the master disk which manages the virtual disk file to be accessed by a virtual machine vm1 is /disk/vm1m.img in the local real disk. Hence, the storage service uses /disk/vm1m.img in the local real disk as the virtual disk file.

When transferring the virtual machine, an entry corresponding to the virtual machine of the transfer target is deleted from the storage correspondence table of the storage service on the transfer source device.

Each entry of the storage correspondence table includes an ID to uniquely identify a virtual machine, the name of a physical disk which stores and manages a virtual disk file to implement the virtual machine, and the name of a path which is address information representing the location (storage location). In FIG. 7, the ID corresponds to "vmid", the physical disk name corresponds to "storage", and the path name corresponds to "Virtual disk file".

Next, the storage service on the transfer source device sends, to the storage service on the transfer destination device, the correspondence relationship information representing the storage correspondence relationship corresponding to the virtual machine of the transfer target. Upon receiving the correspondence relationship information, the storage service on the transfer destination device adds the entry of the virtual machine of the transfer target to the storage correspondence table.

Figure 8:
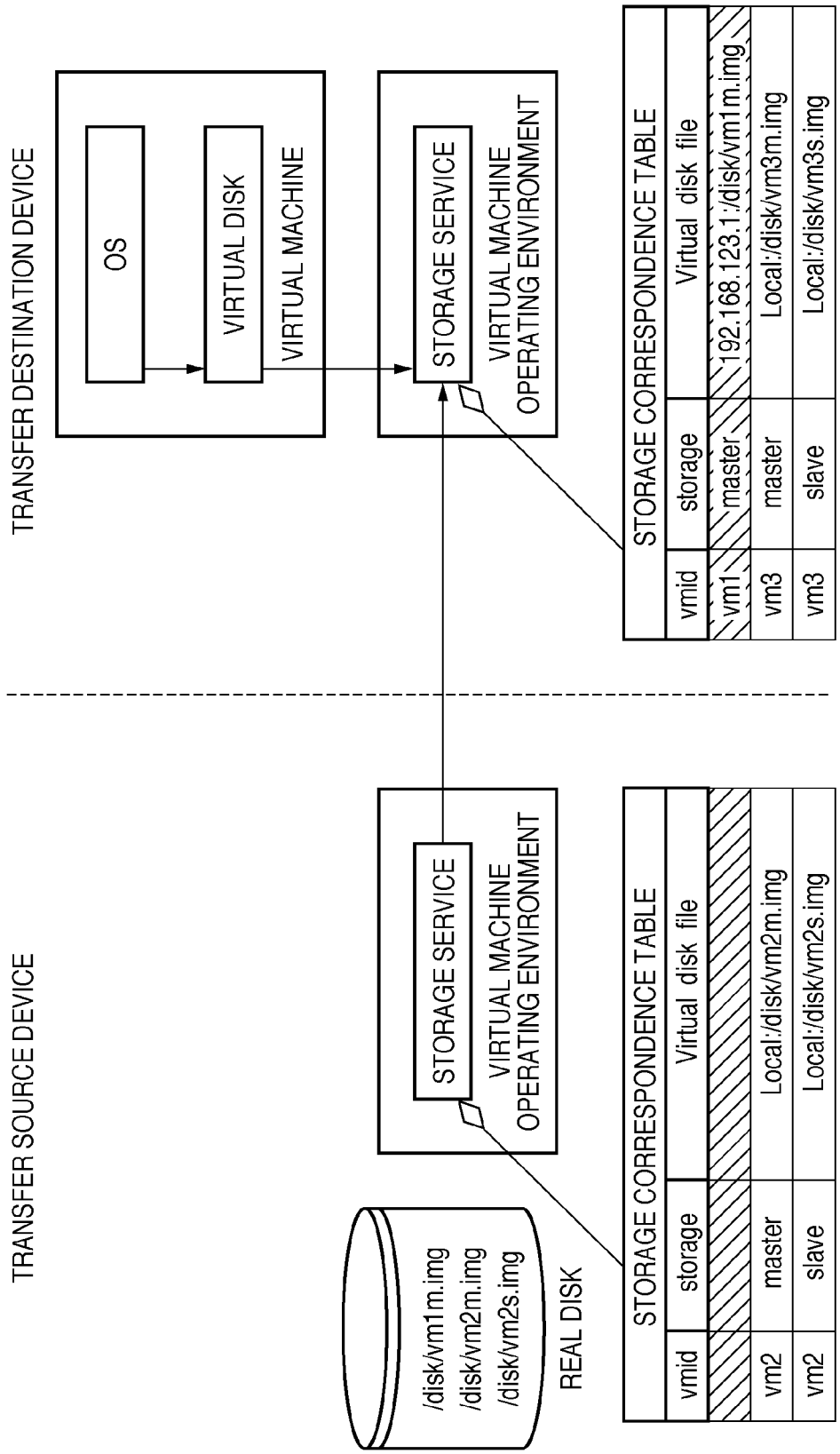
FIG. 8 is a view showing the state of the storage correspondence table during transfer according to the embodiment of the present invention.

For example, in FIG. 8, all entries for which "vmid" is "vm1" are deleted from the storage correspondence table on the transfer source device. An entry for which "vmid" is "vm1" is added to the storage correspondence table on the transfer destination device. At this time, information (IP address in FIG. 8) to specify the transfer source device is described as a file name in "Virtual disk file" of the entry of the transferred virtual machine.

When the virtual machine on the transfer destination device issues an access request to the storage during the operation, the storage service which operates on the transfer destination device has a storage correspondence table which describes files in the remote directory. Hence, the storage service accesses the remote files.

Figure 9:
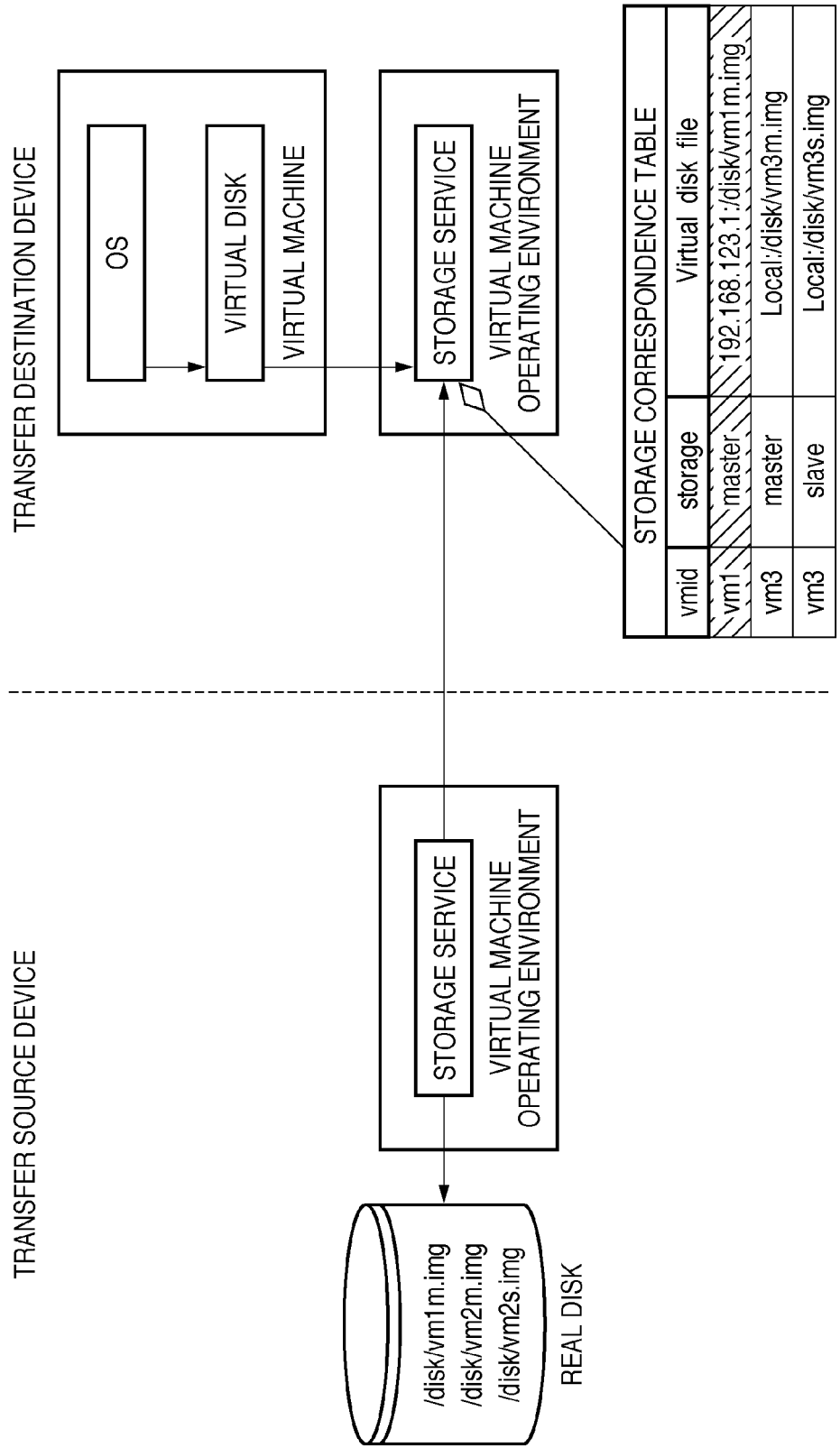
FIG. 9 is a view showing the state of the storage correspondence table after transfer according to the embodiment of the present invention.

For example, the storage correspondence table shown in FIG. 9 describes that the master disk of "vm1" is /disk/vm1m.img in the real disk at 192.168.123.1 (the IP address of the transfer source device). Hence, the storage service uses /disk/vm1m.img in the remote real disk as the virtual disk.

In the above-described way, the contents of the storage correspondence tables managed by the transfer source device and the transfer destination device are updated (entries are deleted or added) based on the correspondence relationship information transferred at the time of virtual machine transfer.

The sequence of transfer processing on the transfer source device from the start to the end of a job will be described next with reference to FIG. 10.

Figure 10:
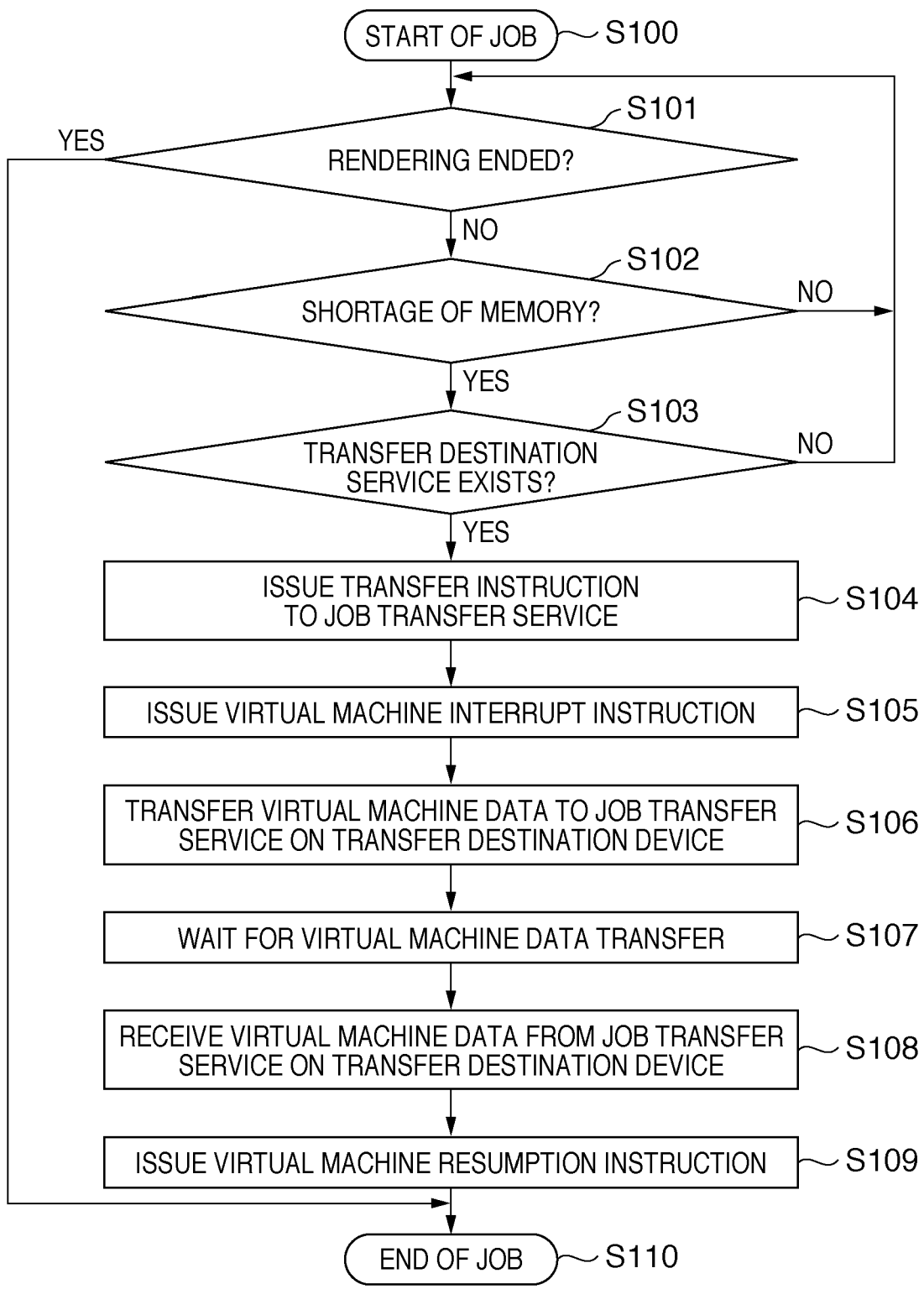
FIG. 10 is a flowchart illustrating transfer processing on a transfer source device from the start to the end of a job according to the embodiment of the present invention.

FIG. 10 is a flowchart illustrating transfer processing on the transfer source device from the start to the end of a job according to the embodiment of the present invention.

When a job (e.g., PDL data) is submitted, a job start state is set (step S100). In the job start state, the virtual machine determines whether rendering of the job has ended (step S101). Rendering is implemented by, e.g., a PDL renderer which is control software implemented on the virtual machine (FIG. 6).

If rendering has ended (YES in step S101), the virtual machine executes remaining processes and then shifts to a job end state (step S110).

If rendering has not ended (NO in step S101), the memory monitoring service determines whether the memory capacity is short (step S102). If the memory capacity is not short (NO in step S102), the process returns to step S101. If the memory capacity is short (YES in step S102), the virtual machine determines whether a transfer destination device exists (step S103).

The transfer destination device can be either a predetermined transfer destination device or a logic to adaptively search for a device with a light load. In determining whether the memory capacity is short, it is determined that the memory capacity is short when, e.g., the available memory capacity is equal to or less than a threshold value, as described above.

If no transfer destination device exists (NO in step S103), the process returns to step S101. If a transfer destination device exists (YES in step S103), the memory monitoring service issues a transfer instruction to the job transfer service (step S104).

Upon receiving the transfer instruction, the job transfer service issues a virtual machine interrupt instruction (step S105).

When the interrupt has ended, the job transfer service transfers, to the job transfer service on the transfer destination device, virtual machine data (VM data), i.e., the snapshot data of the virtual memory, the contents of the virtual register, and the file path of the virtual disk (step S106).

When the transfer has ended, the job transfer service waits until rendering ends on the transfer destination device, and the virtual machine data is transferred (step S107).

When the job transfer service on the transfer destination device has transferred the virtual machine data, the job transfer service receives the virtual machine data (step S108).

Upon receiving the virtual machine data, the job transfer service instructs to resume the virtual machine (step S109).

The resumed virtual machine executes remaining processes and then shifts to a job end state (step S110).

The sequence of transfer processing on the transfer destination device from the start to the end of a job will be described next with reference to FIG. 11.

Figure 11:
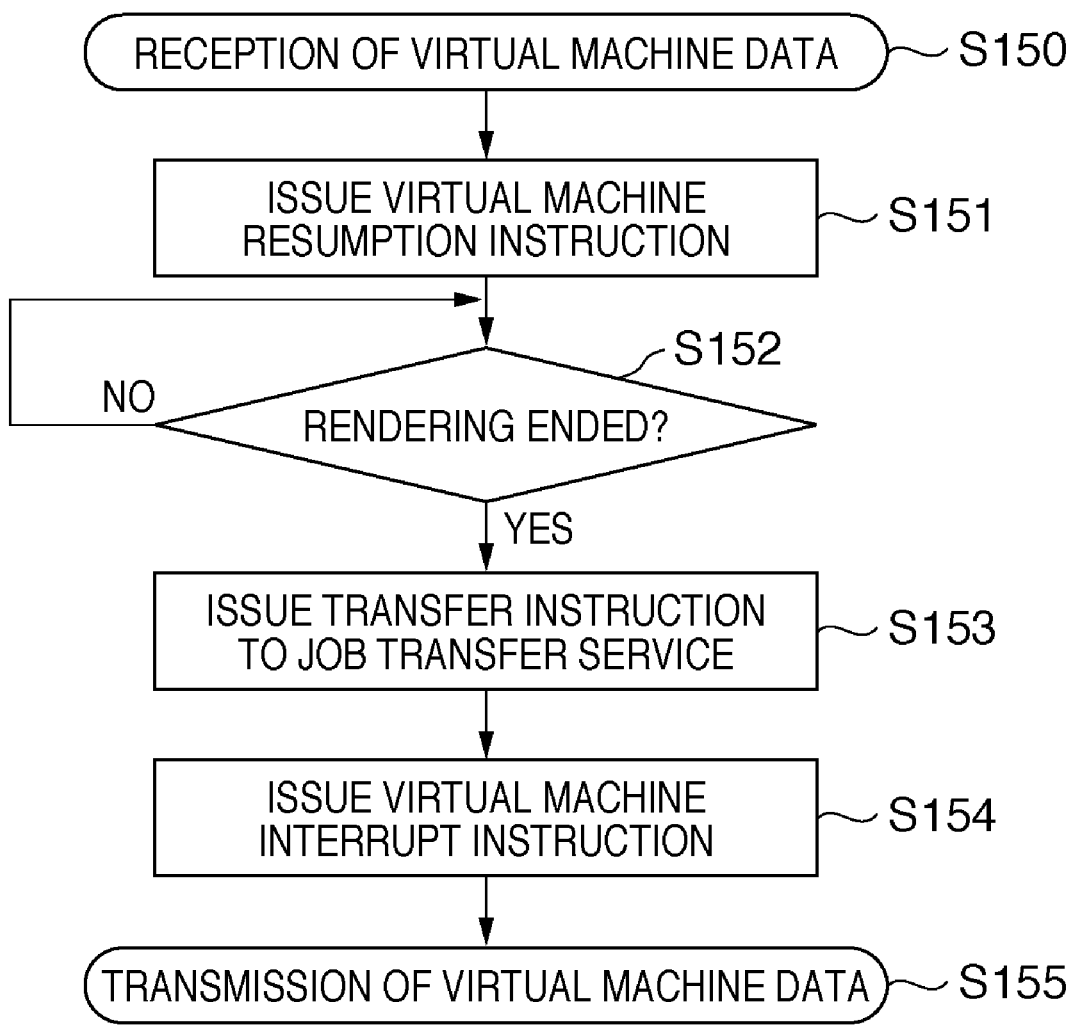
FIG. 11 is a flowchart illustrating transfer processing on a transfer destination device from the start to the end of a job according to the embodiment of the present invention.

FIG. 11 is a flowchart illustrating transfer processing on the transfer destination device from the start to the end of a job according to the embodiment of the present invention.

When the transfer source device has transferred virtual machine data, the job transfer service on the transfer destination device receives the virtual machine data (step S150).

Upon receiving the virtual machine data, the job transfer service instructs to resume the virtual machine (step S151).

The resumed virtual machine automatically starts continuing the job and determines again whether rendering has ended (step S152).

If rendering has not ended (NO in step S152), the virtual machine waits until rendering ends. If rendering has ended (YES in step S152), the virtual machine issues a transfer instruction to the job transfer service (step S153).

Upon receiving the transfer instruction, the job transfer service issues a virtual machine interrupt instruction (step S154).

When the interrupt has ended, the job transfer service transfers the virtual machine data to the job transfer service on the transfer source device (step S155).

The sequence of processing from file read request issue to data acquisition of the virtual machine on the transfer destination device will be described next with reference to FIG. 12.

Figure 12:
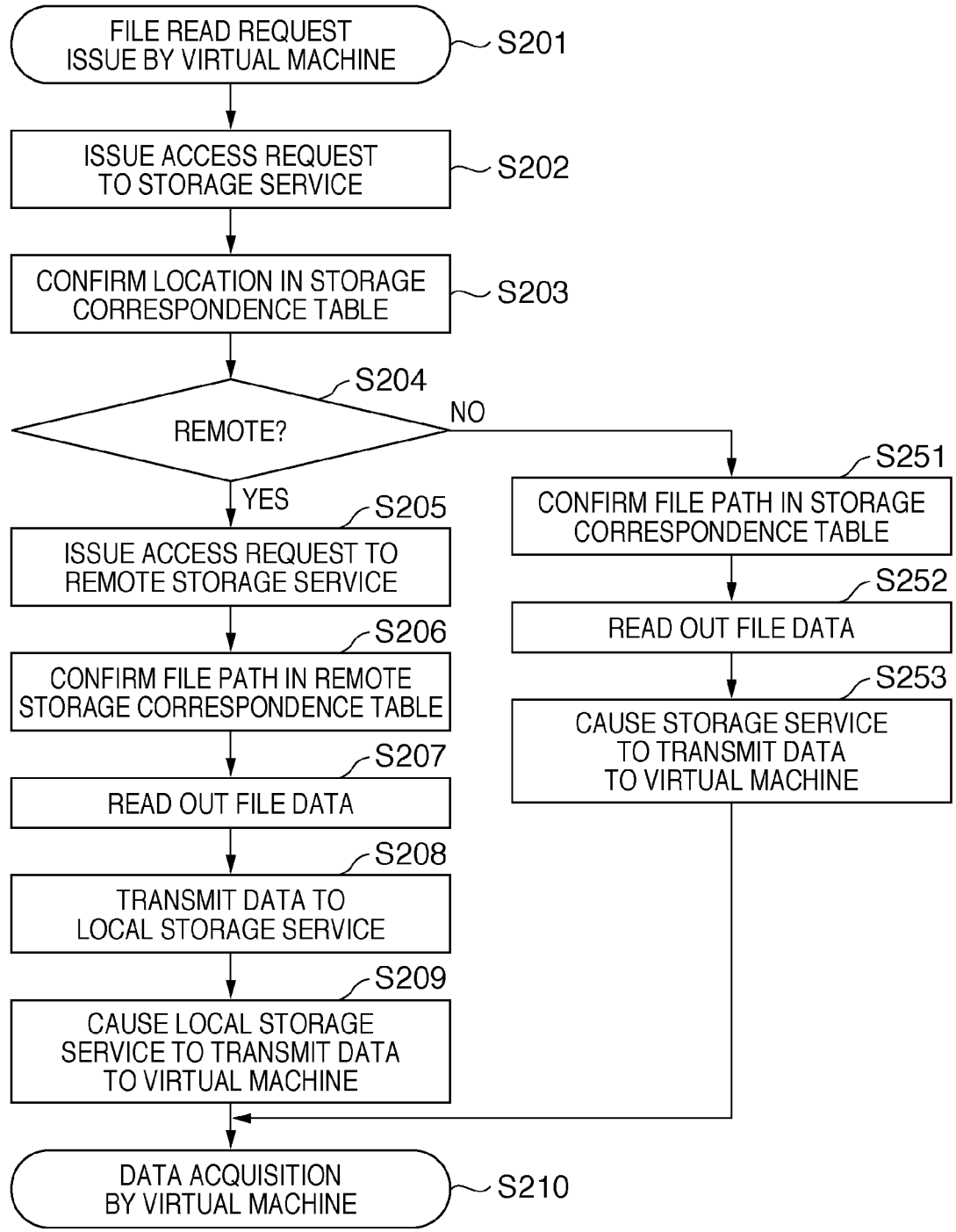
FIG. 12 is a flowchart illustrating processing from file read request issue to data acquisition of a virtual machine according to the embodiment of the present invention.

FIG. 12 is a flowchart illustrating processing from file read request issue to data acquisition of the virtual machine according to the embodiment of the present invention.

In accordance with the operation of the OS on the virtual machine, the virtual machine issues a file read request (step S201). The virtual machine issues an access request to the storage service (step S202).

The virtual machine acquires the correspondence relationship between the virtual machine of the access request source and the virtual disk file by looking up the internal storage correspondence table of the storage service (step S203). The correspondence relationship includes the virtual disk file location information, i.e., information representing whether the virtual disk file exists on the remote device (transfer source device (e.g., server)) or on the local disk.

The virtual machine determines based on the obtained location information whether the virtual disk file exists on the remote device (step S204).

If the virtual disk file does not exist on the remote device (NO in step S204), i.e., if the virtual disk file is on the local disk, the virtual machine confirms the file path of the virtual disk file in the storage correspondence table (step S251). The storage service reads out the data of the file designated in step S201 from the virtual disk file represented by the file path (step S252). The storage service transfers the readout file data to the virtual machine (step S253). The virtual machine acquires the file data (step S210).

If it is determined in step S204 that the virtual disk file exists on the remote device (YES in step S204), the virtual machine issues an access request to the remote storage service (step S205).

The virtual machine of the access request destination acquires the correspondence relationship between the virtual machine of the access request source and the virtual disk file by looking up the internal storage correspondence table of the remote storage service. The virtual machine of the access request destination confirms the file path of the virtual disk file (step S206).

The virtual machine of the access request destination reads out the data of the file designated in step S201 from the virtual disk file represented by the file path (step S207).

The remote storage service transmits the readout file data to the local storage service (step S208).

The local storage service transfers the received file data to the virtual machine (step S209). The virtual machine acquires the file data (step S210).

As described above, according to the embodiment, the correspondence relationship between the virtual machine and the virtual disk file is managed so as to allow the virtual machine to refer to it. By referring to the correspondence relationship, the OS which operates on the virtual machine can seamlessly acquire necessary data independently of whether the location (address information) of the necessary data is local or remote.

In other words, before transfer of the virtual machine, access to the local storage is possible. After transfer of the virtual machine, it is possible to transparently access the remote storage on the transfer source device, which existed before the transfer. This allows to transfer a job in execution at an arbitrary timing, and the user need not waste an unnecessary processing time (e.g., print wait time).

More specifically, even when a job cannot be continued because of memory depletion, the job can be transferred at an arbitrary timing, and the transfer destination device can also refer to the hard disk of the transfer source device. It is therefore possible to output intermediate data to the hard disk of the transfer source device at an arbitrary timing.

In a normal mode, a job is executed without degrading the performance by using the local hard disk. Only in a transfer mode, the hard disk of the transfer source device is used via a network, thereby reducing a drop in the throughput.

A job and OS can access a disk without being conscious of the location of the device. It is therefore possible to perform stop, transfer, and resumption at an arbitrary timing.

In the above embodiment, an example has been described in which a virtual machine operating environment is implemented in an image forming apparatus. However, the present invention is not limited to this. For example, the present invention is also applicable to an information processing apparatus such as a personal computer.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-040456 filed on Feb. 21, 2008, which is hereby incorporated by reference herein in its entirety.

What is claimed is:

1. An information processing apparatus having a virtual machine operating environment where a plurality of virtual machines are operable, comprising:
   a storage unit adapted to store a virtual disk file to be accessed by a virtual machine;
   a communication unit adapted to communicate with another information processing apparatus via a network;
   a transfer unit adapted to transfer the virtual machine between the information processing apparatus and the other information processing apparatus via said communication unit;
   a management unit adapted to manage, for each of the virtual machines which operate in the virtual machine operating environment of the information processing apparatus, including virtual machines which have operated in another virtual machine operating environment of the other information processing apparatus, correspondence relationship information representing a correspondence relationship between the virtual machine and said storage unit which stores the virtual disk file to be accessed by the virtual machine using a storage correspondence table, the correspondence relationship information being transferred from the other information processing apparatus by said transfer unit; and
   a control unit adapted to control access from the virtual machine which has issued an access request to the virtual disk file by looking up the storage correspondence table managed by said management unit.

2. The apparatus according to claim 1, wherein
   the correspondence relationship information includes address information representing a storage location in one of said storage unit of the information processing apparatus and the storage unit of the other information processing apparatus, where a virtual disk file to be accessed by each of the virtual machines operating in the virtual machine operating environment of the information processing apparatus is stored, and
   said control unit controls, in accordance with the address information included in the correspondence relationship information for the virtual machine which has issued an access request, access from the virtual machine to the virtual disk file at the storage location represented by the address information, by looking up the storage correspondence table.

3. The apparatus according to claim 1, wherein to transfer a job which is being executed on the virtual machine, said transfer unit temporarily stops the virtual machine, transfers the virtual machine to the other information processing apparatus of a transfer destination, and resumes the virtual machine in the other information processing apparatus of the transfer destination, thereby transferring the job which is being executed.

4. The apparatus according to claim 1, further comprising a determination unit adapted to determine whether a normal operation of the virtual machine in the virtual machine operating environment can be continued,
   wherein if said determination unit determines that the normal operation of the virtual machine cannot be continued, said transfer unit transfers the virtual machine to the other information processing apparatus.

5. The apparatus according to claim 1, wherein at a timing of transfer of the virtual machine of a transfer target, said transfer unit transfers the correspondence relationship information of the virtual machine to the other information processing apparatus together with the virtual machine of the transfer target.

6. The apparatus according to claim 1, wherein said management unit updates the storage correspondence table based on one of the correspondence relationship information of a virtual machine transferred by said transfer unit from the information processing apparatus to the other information processing apparatus and the correspondence relationship information of a virtual machine received by said transfer unit from the other information processing apparatus to the information processing apparatus.

7. A method of controlling an information processing apparatus having a virtual machine operating environment where a plurality of virtual machines are operable, comprising the steps of:
   transferring a virtual machine between the information processing apparatus and another information processing apparatus via a communication unit adapted to communicate with the other information processing apparatus via a network;
   managing, for each of the virtual machines which operate in the virtual machine operating environment of the information processing apparatus, including virtual machines which have operated in another virtual machine operating environment of the other information processing apparatus, correspondence relationship information representing a correspondence relationship between the virtual machine and a storage unit which stores a virtual disk file to be accessed by the virtual machine using a storage correspondence table, the correspondence relationship information being transferred from the other information processing apparatus in the transferring step; and
   controlling access from the virtual machine which has issued an access request to the virtual disk file by looking up the storage correspondence table managed in the managing step.

8. A program stored in a computer-readable medium to cause a computer to control an information processing apparatus having a virtual machine operating environment where a plurality of virtual machines are operable, the program causing the computer to execute the steps of:

transferring a virtual machine between the information processing apparatus and another information processing apparatus via a communication unit adapted to communicate with the other information processing apparatus via a network;

managing, for each of the virtual machines which operate in the virtual machine operating environment of the information processing apparatus, including virtual machines which have operated in another virtual machine operating environment of the other information processing apparatus, correspondence relationship information representing a correspondence relationship between the virtual machine and a storage unit which stores a virtual disk file to be accessed by the virtual machine using a storage correspondence table, the correspondence relationship information being transferred from the other information processing apparatus in the transferring step; and controlling access from the virtual machine which has issued an access request to the virtual disk file by looking up the storage correspondence table managed in the managing step.

* * * * *